(No Model.)

L. L. HITT.
RIM FOR WHEELS.

No. 342,095. Patented May 18, 1886.

WITNESSES:
Donn Twitchell
C. Sedgwick

INVENTOR:
L. L. Hitt
BY Munn & Co.
ATTORNEYS.

United States Patent Office.

LEWIS LUNSFORD HITT, OF RINGGOLD, GEORGIA.

RIM FOR WHEELS.

SPECIFICATION forming part of Letters Patent No. 342,095, dated May 18, 1886.

Application filed November 24, 1885. Serial No. 183,862. (No model.)

*To all whom it may concern:*

Be it known that I, LEWIS LUNSFORD HITT, of Ringgold, in the county of Catoosa and State of Georgia, have invented certain new and useful Improvements in Tires for Wheels, of which the following is a full, clear, and exact description.

This invention consists, first, in the construction and arrangement of parts, as will be hereinafter fully described and claimed; second, in forming the flanges on the tire V-shaped, so that the outer edges and sides of the fellies may be protected by the projecting flanges, and beveling the edges of the fellies to correspond therewith; third, a bolt having a suitably-shaped head, by which the tire and the fellies are firmly united, the shank of the bolt being straight, so that its outer end may be upset or riveted in a countersink in the tire.

Reference is to be had to the accompanying drawings, forming a part of this specification, in which similar letters of reference indicate corresponding parts in all the figures.

Figure 1:
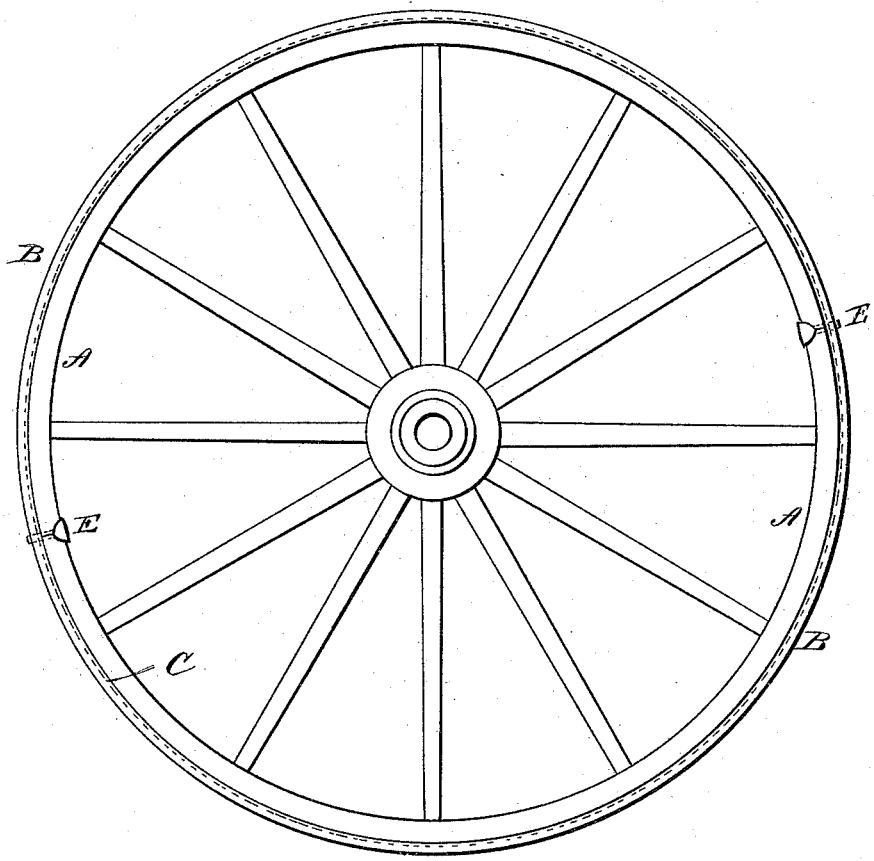
Figure 2:
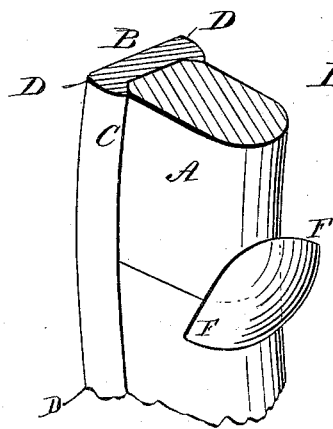
Figure 3:
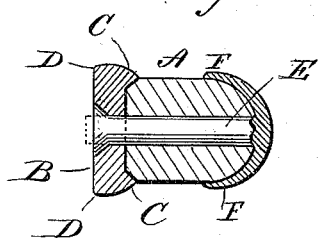

Figure 1 represents a side elevation of a wheel having my improved tire and connecting-bolt applied thereto. Fig. 2 is a perspective view of a fragment of a felly and tire, showing the connecting-bolt in position through the felly and tire preparatory to riveting its end into the tire and turning down the ends of its head over the sides of the felly. Fig. 3 represents a cross-section of a felly, tire, and connecting-bolt, the head of the bolt in section and its shank in elevation.

A in the accompanying drawings represents the felly of a wheel to which is fitted my improved ribbed or flanged tire B. In this form of construction the felly A consists of a single piece of wood bent in the usual manner to form the rim of the wheel.

B represents my new improvement, consisting of a tire provided with inwardly-projecting flanges or ribs C, which incase the outer edges of the felly, as shown in Figs. 2 and 3.

In order that these flanges C may present a light and finished appearance, to obtain the required strength to stiffen the tire, and to protect the sides of the felly from injury, they are made V-shaped, so that by beveling the outer edges of the felly and seating it between the flanges on the tire the outer edges or corners D of the tire will project considerably beyond the sides of the felly, and the flanges C will only present the thin edge of the V against the side of the felly, as shown in Figs. 2 and 3. By this construction the felly is held firmly in its seat in the tire, and all lateral movement thereof is prevented.

To secure the tire to the felly, a bolt, E, is provided, the shank of which is passed through the felly and tire from the inner side, and its end riveted in a recess in the outer surface of the tire, as represented in Fig. 3. After the bolt E has been riveted in the tire the thin part F of the double-V-shaped head is bent over the rounded edges of the felly and down upon its sides, which completes the connection and firmly secures the felly and tire together, as shown in Fig. 3.

It will be observed that the shank of the bolt E passes through the felly A, where its two ends meet. Half of the shank being in each end of the felly, forms a dovetail to assist in maintaining the ends of the felly in position laterally. The double-V-shaped head extending over the two ends incloses them, as shown in Figs. 1 and 3.

Having thus described my invention, I claim as new and desire to secure by Letters Patent—

The combination, with the tire and felly, of a bolt formed with an integral head bent over the felly, as shown at F F, the shank of the bolt passing through the felly and tire and riveted in the tire, substantially as set forth.

LEWIS LUNSFORD HITT.

Witnesses:
JOHN T. SHEPHERD,
WM. T. EWING.